United States Patent
Suchta et al.

(10) Patent No.: US 10,066,575 B2
(45) Date of Patent: Sep. 4, 2018

(54) METHOD AND SYSTEM FOR GASOLINE PARTICULATE FILTER OPERATIONS

(71) Applicant: Ford Global Technologies, LLC, Dearborn, MI (US)

(72) Inventors: Nikodem Suchta, Rochester Hills, MI (US); Jacqueline A. Lymburner, Carleton, MI (US); Michiel J. Van Nieuwstadt, Ann Arbor, MI (US); John Edward Hedges, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 15/211,536

(22) Filed: Jul. 15, 2016

(65) Prior Publication Data

US 2018/0017012 A1  Jan. 18, 2018

(51) Int. Cl.
| | |
|---|---|
| *F02D 41/40* | (2006.01) |
| *F01N 3/021* | (2006.01) |
| *F01N 3/023* | (2006.01) |
| *F02D 41/38* | (2006.01) |

(52) U.S. Cl.
CPC .......... *F02D 41/401* (2013.01); *F01N 3/021* (2013.01); *F01N 3/023* (2013.01); *F02D 41/3836* (2013.01); *F01N 2900/1602* (2013.01); *F01N 2900/1606* (2013.01); *F02D 2200/0812* (2013.01)

(58) Field of Classification Search
CPC .............. F02D 41/401; F02D 41/3836; F02D 2200/0812; F02D 2200/021; F02D 2200/101; F02D 41/064; F02D 2200/10; F01N 3/023; F01N 3/021; F01N 2900/1606; F01N 2900/16; F01N 2430/00; F01N 2430/06; F01N 2430/08; F01N 11/00; F01N 2900/1602; F01N 2900/1611
USPC .......... 123/672, 679, 681, 434; 60/274, 285, 60/272
See application file for complete search history.

(56) References Cited

U.S. PATENT DOCUMENTS

| | | | |
|---|---|---|---|
| 8,793,984 B2 | 8/2014 | Chen et al. | |
| 9,027,333 B2 | 5/2015 | Neely et al. | |
| 2011/0174268 A1* | 7/2011 | Surnilla | F02D 35/027 123/406.29 |
| 2012/0053814 A1* | 3/2012 | George | F01N 3/0231 701/102 |
| 2014/0297162 A1* | 10/2014 | Surnilla | F02D 41/3094 701/104 |
| 2016/0123259 A1* | 5/2016 | Schaffner | F02D 41/029 60/274 |

(Continued)

*Primary Examiner* — Joseph Dallo
*Assistant Examiner* — Scott A Reinbold
(74) *Attorney, Agent, or Firm* — Julia Voutyras; McCoy Russell LLP

(57) ABSTRACT

Methods and systems are provided for optimal operation of a gasoline particulate filter coupled to an engine exhaust system. Based on engine operating conditions, a target soot level on the GPF may be determined, and one or more engine operating parameters may be adjusted to maintain the actual GPF soot level at the target level. In one example, if the actual GPF soot level is lower than the target level, one or more of a fuel injection timing and a fuel rail pressure may be adjusted to increase soot generation, and if the actual GPF soot level is higher than the target level, the GPF may be regenerated until the actual soot level reaches the target level.

20 Claims, 3 Drawing Sheets

(56) References Cited

U.S. PATENT DOCUMENTS

2016/0160723 A1\* 6/2016 Thomas ................. F01N 3/101
60/274

\* cited by examiner

METHOD AND SYSTEM FOR GASOLINE PARTICULATE FILTER OPERATIONS

FIELD

The present description relates generally to methods and systems for a gasoline particulate filter coupled in an engine exhaust.

BACKGROUND/SUMMARY

Engine combustion using gasoline fuel may generate particulate matter (PM) (such as soot and aerosols) that may be exhausted to the atmosphere. To enable emissions compliance, gasoline particulate filters (GPF) may be included in the engine exhaust, to filter out exhaust PMs before releasing the exhaust to the atmosphere. A higher efficiency GPF comprising a denser filtration mesh may be used for increased emissions quality, especially during cold-start conditions.

To maintain the efficiency of the exhaust system particulate filter, the filter may need to be intermittently regenerated. In one example approach, shown by Neely et al. in U.S. Pat. No. 9,027,333, a diesel particulate filter (DPF) is regenerated responsive to a higher than threshold soot level. In particular, the regeneration is controlled so that a small level of soot is maintained on the filter in order to provide optimal efficiency for hydrocarbon conversion during conditions such as an upcoming cold start. In other approaches, the entire soot accumulated on the filter may be removed during the regeneration process.

However, the inventors herein have recognized potential issues with such approaches. As one example, since filters tend to be least efficient when they are clean of soot or ash, filters with higher filtration features (such as a denser mesh rate) are typically implemented in engine systems. When the filters are clean, the pores in the substrate may be fully open, consequently the particles may be able to traverse more easily through them and the probability of collisions and sticking may be reduced, thereby adversely affecting the soot capture rate. However, use of higher filtration capability filters may result in elevated exhaust backpressure which may adversely affect engine power and increase fuel consumption. Also, such filters can add significant costs. Another issue is that the optimal level of residual soot level on the filter may vary with operating conditions. For example, the residual soot level which corresponds to optimal emissions control during a cold-start may be higher than the residual soot level that is optimal for idling engine conditions. As a result, the soot level remaining on the filter following a regeneration at an engine cold-start may lead to inefficient exhaust emissions during a subsequent engine idling condition. Further still, the level of ash accumulated on the filter following a regeneration event, as well as the distribution of the ash throughout the filter, may influence operation of the filter as well as the resulting exhaust backpressure. For example, even if the residual soot level is lower, if there is a significant amount of ash left over in the filter from the previous regeneration event, the total loading on the filter may be higher than the optimal soot level desired for improved emissions quality.

In one example, the issues described above may be addressed by a method comprising, responsive to actual soot level at an exhaust particulate filter being lower than a target soot level, adjusting one or more of a fuel injection timing and a fuel injection pressure to increase soot output of the engine until the actual soot level is at the target soot level, the target soot level varied based on engine temperature and engine load. In this way, a lower filtration capability GPF may be utilized to achieve a lower backpressure by actively maintaining a level of residual soot on the filter.

As one example, a gasoline particulate filter (GPF) with a lower filtration feature (such as a lower density filtration mesh) may be coupled to an engine exhaust system. An optimal residual soot level (target level) to be maintained at the GPF may be determined by an engine controller based on engine operating conditions including engine temperature, engine speed, engine load, fueling schedule etc. A soot level at the GPF may be estimated based on inputs from one or more pressure sensors coupled upstream and/or downstream of the GPF. If it is determined that the soot level on the GPF is lower than the target level for the current engine operating conditions, one or more engine actuators may be adjusted to actively accumulate soot on the GPF. As an example, a start of fuel injection timing may be advanced, and/or a fuel rail pressure may be reduced to increase soot levels in the exhaust stream based on the actual soot level relative to the target soot level. Also, an ash level on the GPF generated during prior regeneration events may be taken into account. For example, soot accumulation may be increased until a determined combined soot and ash level on the filter is at the target level. If it is determined that the current soot level on the GPF is higher than the target level for the current engine operating conditions, the GPF may be regenerated to remove the excess soot. A rate of the regeneration may be limited to reduce the soot level on the filter to the target level and not lower. Also, if the rate of regeneration is higher than a target rate, spark timing may be retarded to increase soot generation so that the soot level on the filter equilibrates to the target level at the end of the regeneration, and does not decrease below the target level.

In this way, by relying on soot and ash levels at a filter to increase the particulate matter (PM) capture rate of an exhaust system PM filter, the reliance on expensive filters having higher mesh density is reduced. By using filters with lower mesh density, exhaust backpressure may be reduced. As such, the reduction in backpressure increases engine power and fuel efficiency. The technical effect of maintaining a residual soot level (target level) at the GPF is that operating efficiency of the GPF may be improved. By actively adjusting the target level based on current engine operating conditions, performance of the exhaust emissions system may be optimized during all operating conditions including engine cold-starts. Overall, by using a lower filtration capability GPF and by maintaining a residual soot level on the GPF, engine efficiency, emissions quality, and fuel efficiency may be improved in a gasoline engine system. In addition, exhaust soot control and exhaust backpressure control can be achieved using a less expensive filter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
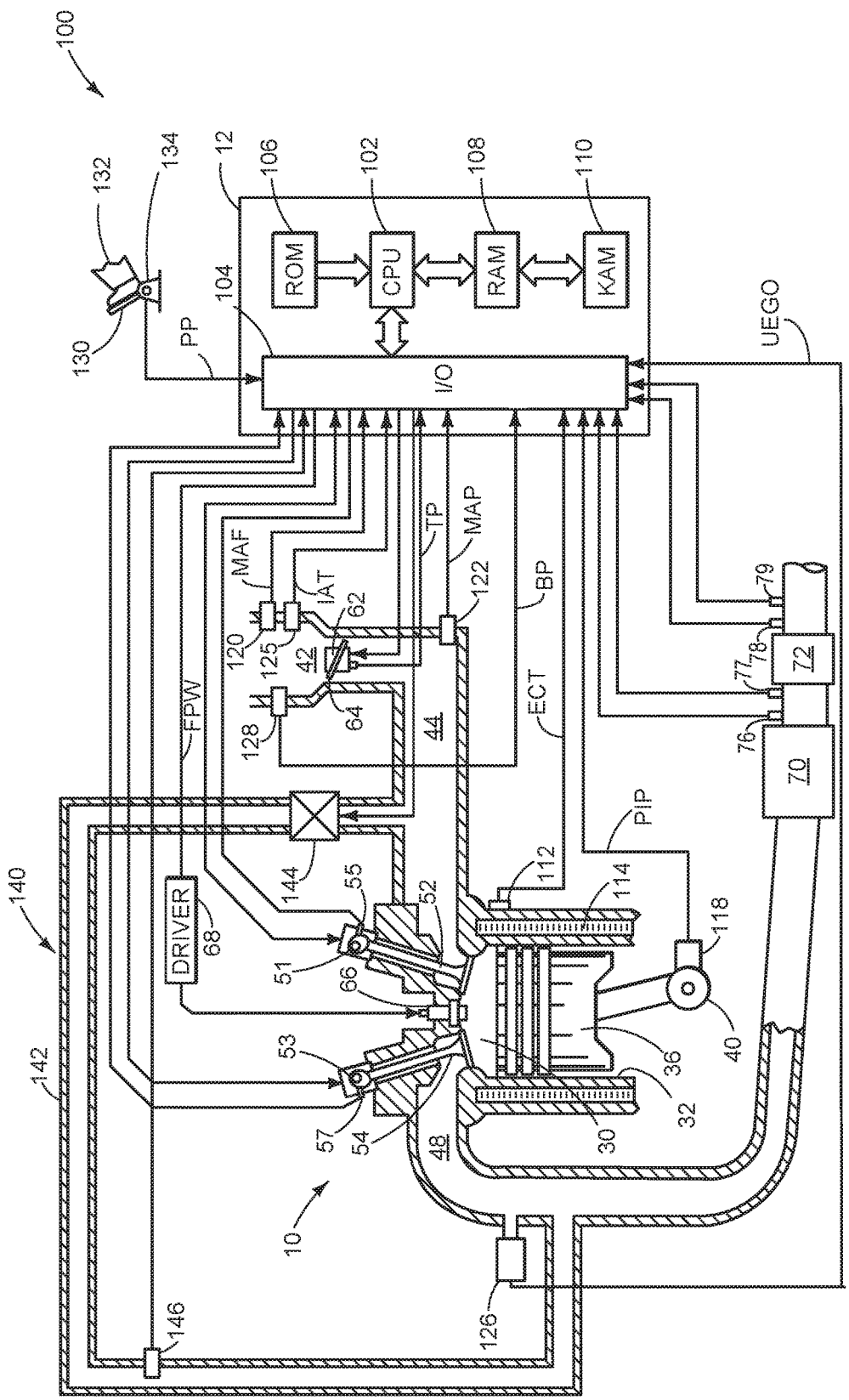
FIG. 1 shows an example engine system including a gasoline particulate filter (GPF).

The following description relates to systems and methods for maintaining a target soot level at a gasoline particulate filter (GPF) based on current engine operation conditions in order to improve emissions quality. A lower filtration capability gasoline particulate filter, may be used in an engine system, as shown in FIG. 1. An engine controller may be configured to perform a control routine, such as the example routine of FIG. 2, to adjust one or more engine operating parameters to maintain a desired soot and ash level at the GPF determined by the controller. An example of such adjustments for maintenance of the desired soot and ash level is shown in FIG. 3.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. The intake passage 144 may include a throttle 162 having a throttle plate 164. In this particular example, the position of throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber among other engine cylinders. The position of the throttle plate 64 may be provided to the controller 12 by a throttle position signal TP. The air intake passage 142 may include the intake air temperature (IAT) sensor and the barometric pressure (BP) sensor. The IAT sensor estimates intake air temperature to be used in engine operations and provides a signal to the controller 12. Similarly, the BP sensor estimates the ambient pressure for engine operations and provides a signal to the controller 12. The intake passage 142 may further include a mass air flow sensor and a manifold air pressure sensor 122 for providing respective signals MAF and MAP to the controller 12.

An exhaust gas sensor 126 is shown coupled to the exhaust passage 148 upstream of an emission control device 70. The sensor 126 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor. An oxygen sensor may be used to estimate the AFR for both intake and exhaust gas. Based on AFR estimation, engine operating parameters e.g., fueling may be regulated.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, such as described herein below.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tank in fuel system 172 may hold fuel with different fuel qualities, such as different fuel compositions. These differences may include different alcohol content, different octane, different heat of vaporizations, different fuel blends, and/or combinations thereof etc.

The emission control device 70 is shown arranged along the exhaust passage 148 downstream of the exhaust gas sensor 126. The device 70 may be a three way catalyst (TWC), NOx trap, various other emission control devices, or combinations thereof. A gasoline particulate filter (GPF) 72 may be coupled to the exhaust passage 148 downstream of the emission control device 70. A first pressure sensor 76 may be coupled to the exhaust passage upstream of the GPF 72, and a second pressure sensor 78 may be coupled to the exhaust passage 148 downstream of the GPF 72. Also, a first temperature sensor 77 may be coupled to the exhaust passage upstream of the GPF 72, and a second temperature sensor 79 may be coupled to the exhaust passage 148 downstream of the GPF 72.

The GPF 72 may comprise an outer covering enclosing a monolithic (honeycomb) structure within. The monolithic structure may consist of individual cells with alternate orientations such that particulate matter (soot) present in the exhaust stream may get trapped in certain specific (first set) cells which act as inlet channels while the exhaust may pass unobstructed through a second set of cells which act as outlet channels. Soot may be generated in the engine cylinders during combustion, and the level of soot generation may increase during incomplete combustion events. The soot level on the GPF may be removed to a desired level by regenerating the GPF wherein higher temperature from an electrical circuit may be used to burn the accumulated soot level. During regeneration of the GPF, as the soot is burnt off, ash may be generated which accumulates in the GPF.

Due to the dense monolithic structure of the GPF, a backpressure may be created in the exhaust system which may adversely affect engine performance and fuel economy. To reduce the backpressure, the GPF may be configured with a lower filtration parameter. For example, the GPF may be of a lower filtration capability with fewer cells comprising the monolithic structure. Also, by using a lower filtration capability GPF, component cost may be reduced. In order to maintain a capture rate of soot at the GPF above a threshold capture rate such that the emissions quality may not deteriorate, a target level of soot may need to be maintained at the GPF. The target load may be selected based on one or more engine operating conditions, such as each of an engine temperature, an engine speed, an engine load, and fueling schedule. For example, the target load may be stored in the engine controller's memory in a look-up table as a function of engine load, engine speed, and engine temperature. The target load may be increased with a decrease in the engine temperature, an increase in the engine speed, and an increase in the engine load. Also, an ash level on the GPF may be estimated in the controller based on filter regeneration parameters, and the target soot level may be further based on the estimated ash level to maintain an aggregated ash and soot level of the GPF within a threshold level. In one example, the ash level may be estimated based on each of the measured and/or estimated soot load on the GPF at the time of the filter regeneration, exhaust temperature and exhaust flow rate through the filter during the filter regeneration, as well as a duration of the filter regeneration. In this example, the determined amount of ash is a different quantity than the determined amount of soot.

A current soot level at the GPF may be estimated based on inputs from one or more of the pressure sensors 76, 78, and temperature sensors 77, and 79 coupled to the exhaust passage upstream and downstream of the GPF. For example, the soot load of the GPF may be determined as a function of the pressure differential and/or temperature differential across the GPF, the estimated soot load increased as the pressure differential increases. If it is determined that the soot level on the GPF is lower than the target level for the current engine operating conditions, one or more engine actuators may be adjusted to actively increase exhaust soot generation and soot accumulation on the GPF to the target level. In one example, adjusting one or more engine actuators includes adjusting one or more of a fuel injection timing and a fuel rail pressure to actively raise the actual soot level to the target soot level. As an example, a start of fuel injection timing may be advanced, and/or a fuel rail pressure may be reduced to cause complete combustion at the cylinders which may generate a higher soot level. A degree of advancing the start of injection timing, and a degree of reducing the fuel rail pressure may be increased as the difference between the target soot level and the actual soot level increases. Also, responsive to the actual soot level at the GPF being higher than the target soot level, filter regeneration may be initiated, and filter regeneration may be discontinued when the actual soot level is reduced to the target soot level. Also, if the rate of regeneration is higher than a threshold rate, spark timing may be retarded to increase soot generation such that after the regeneration process, the GPF soot level does not decrease below the target level. A detailed description of a method to maintain a desired soot level at the GPF will be discussed in relation to FIG. 2.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. The controller 12 may receive various signals from sensors coupled to the engine 10, in addition to those signals previously discussed, including measurement of GPF soot level from exhaust system pressure and temperature sensors 76, 77, 78, and 79, inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

The controller 12 receives signals from the various sensors of FIG. 1 and employs the various actuators of FIG. 1 to adjust engine operation based on the received signals and instructions stored on a memory of the controller 12. In one example, the controller 12 may estimate a soot level on the GPF based on signals received from one or more exhaust passage pressure and temperature sensors 76, 77, 78, and 79, and based on a difference between the estimated GPF soot level and a target soot level, the controller may send a signal to one or more engine actuators to maintain the GPF soot level at the target level. As an example, if the estimated GPF soot level is lower than the target level, the controller 12 may send a pulse-width signal to an electronic driver coupled to the fuel injector to advance the start of the injection timing. If the estimated GPF soot level is higher than the target level, the controller 12 may send a signal to an electric switch of an electric circuit coupled to the GPF, to close the electric circuit and initiate a GPF regeneration process to lower the GPF soot level to the target level. Also, during the regeneration process, the controller 12 may send a signal to the spark plug 192 to retard spark timing.

In this way, the system of FIG. 1 provides for an engine system comprising: an engine including a cylinder, an exhaust passage receiving combustion gases from the cylinder, a gasoline particulate filter (GPF) having a lower than threshold filtration mesh density, coupled to the exhaust passage, one or more pressure sensors coupled to the GPF, one or more temperature sensors coupled to the GPF, a fueling system including a fuel rail, a fuel tank, a fuel pump, and a fuel injector for delivering fuel to the engine cylinder, and a controller with computer readable instructions stored on non-transitory memory for: inferring an actual soot load of the GPF based on inputs of the one or more pressure sensors and temperature sensors, and as the actual soot load falls below the target load, increasing soot output by the engine by advancing a timing of actuating the fuel injector or decreasing a pressure of the fuel rail until the actual soot load is at the target load.

Figure 2:
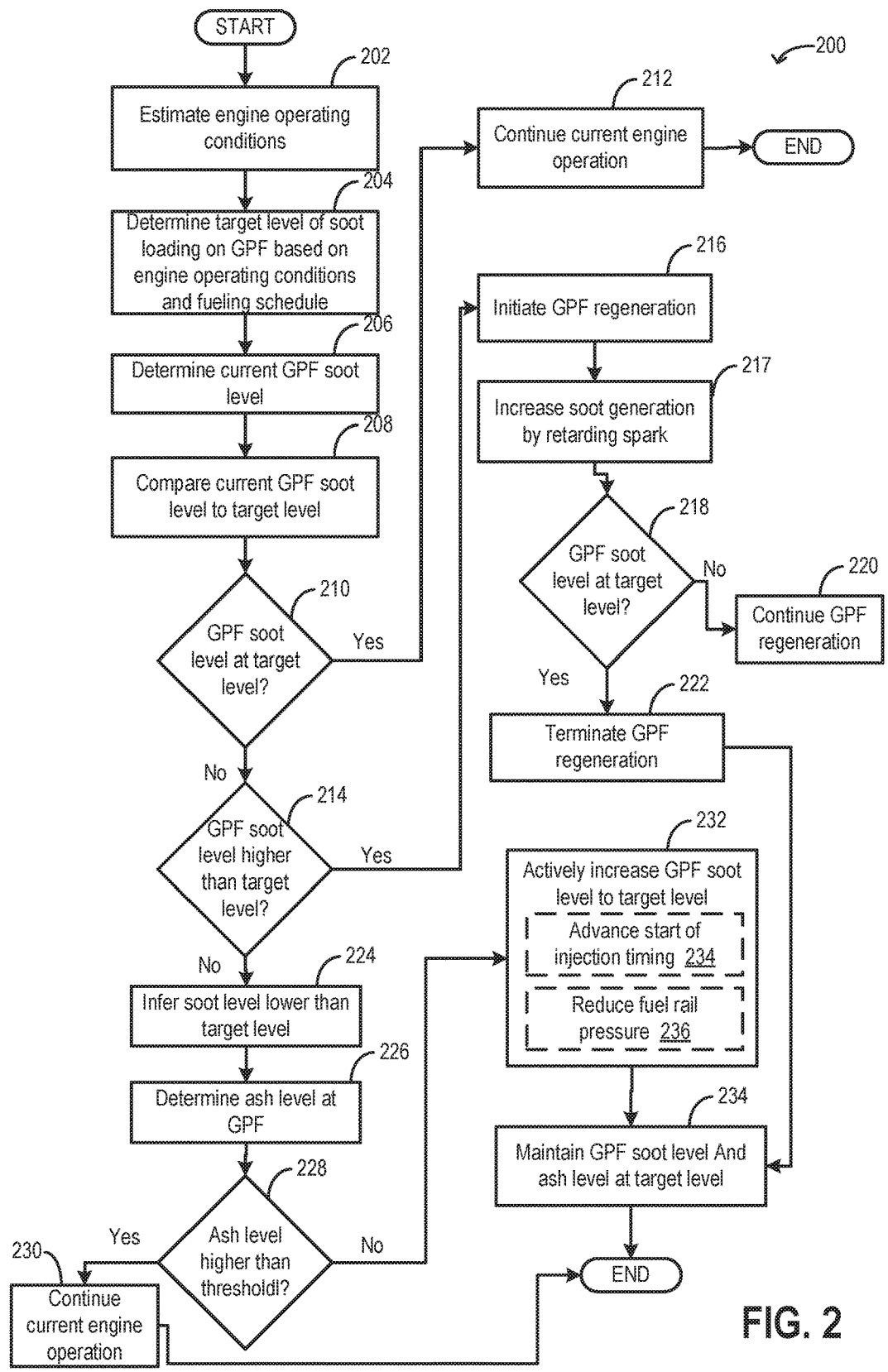
FIG. 2 shows a flow chart illustrating a method that can be implemented to maintain a desired soot and ash level at the GPF based on current engine operation conditions.
Figure 3:
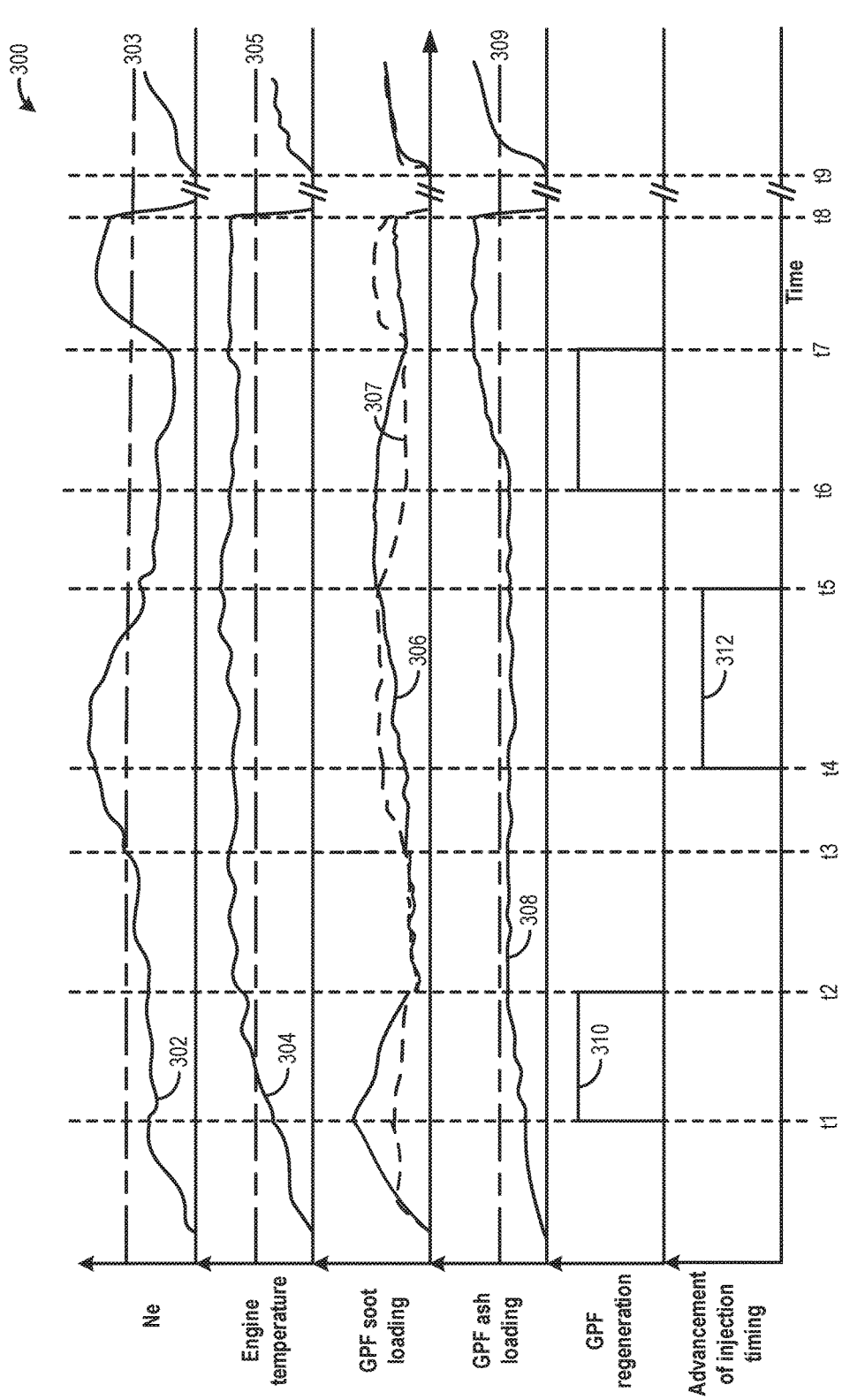
FIG. 3 shows an example of adjustments to engine operating parameters to maintain the desired soot and ash level, according to the present disclosure.

FIG. 2 illustrates an example method 200 that may be implemented to maintain a desired soot and ash level at a gas particulate filter (GPF) (such as GPF 72 in FIG. 1) based on engine operating conditions. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes estimating and/or measuring current engine operating conditions. Conditions assessed may include, for example, driver torque demand, engine temperature, engine load, engine speed, throttle position, exhaust pressure, exhaust air/fuel ratio, etc.

Based on the current engine operating conditions, an optimal soot level may be selected and maintained at the GPF in order to provide for improved GPF performance and emissions quality. By maintaining a target soot level on the GPF, the capture rate of the engine generated soot particles at the GPF may be increased. In particular, at 204, a target soot level desired on the GPF may be determined based on the current engine operating conditions, and fueling schedule. In one example, the routine determines the target GPF soot level may be based on one or more of engine temperature, engine load, and engine speed. The controller may determine the target GPF soot level through a determination that directly takes into account an estimated engine temperature, engine load, engine speed, and a current fueling schedule. Engine temperature, engine load, and engine speed may be directly measured via engine sensors such as exhaust temperature sensor, Hall effect sensor, etc., or determined based on engine operating conditions. The controller may alternatively determine the target GPF soot level based on a calculation using a look-up table with the input being one or more of engine temperature, engine load, and engine speed, and the output being the corresponding target GPF soot level. In one example, the target soot level is set to a first target soot level during engine start conditions when the engine temperature is below a threshold temperature and the engine speed is below a threshold speed, the target soot level is set to a second target soot level during engine idling conditions when the engine temperature is above the threshold temperature and the engine speed is below the threshold speed, and the target soot level is set to a third target soot level when the engine temperature is above the threshold temperature and the engine speed is above the threshold speed. The first, second, and third target soot level may be distinct from each other. In one example, the first target soot level may be lower than the second target soot level, and the second target soot level may be lower than the third target soot level. In another example, the second target soot level may be lower than first target soot level, and higher than the third soot level. Also, variables including GPF mid-bed temperature (measured and/or modeled), air charge temperature, fuel injection schedule (e.g., use of split injection, presence of one or more of intake and compression direct injections) may influence the target soot level. Based on each of the mentioned variables, there may be a unique soot and/or ash target that would result in an optimal combination of engine soot output and particulate filtration efficiency. As an example, a first target soot level may be based on a fuel injection schedule during the engine start conditions, a second target soot level may be based on the fuel injection schedule during the engine idling conditions, and a third target soot level may be based on the fuel injection schedule when the engine temperature is above the threshold temperature and the engine speed is above the threshold speed, wherein the fuel injection schedule includes one or more of a split ratio of port injected fuel relative to direct injected fuel, a split ratio of compression stroke directed injected fuel relative to intake stroke direct injected fuel, and a number of compression stroke direct injections per fueling event.

At 206, a current soot level on the GPF may be estimated based on inputs from one or more exhaust passage temperature and pressure sensors (such as sensors 76, 77, 78, and 79 in FIG. 1) coupled upstream and/or downstream of the GPF. For example, the pressure differential and/or temperature differential across the GPF may be estimated (based on inputs of the pressure and temperature sensors) and the soot load of the GPF may be determined as a function of the pressure differential and/or temperature differential. As the soot load on the GPF increases, there may be a corresponding increase in the pressure and temperature differential across the GPF.

At 208, the current (estimated) GPF soot level may be compared to the target soot level and a difference between the current GPF soot level and the target soot level may be determined. At 210, the routine includes determining if the current GPF soot level is equal to the target soot level. Alternatively, it may be determined if the difference between the current GPF soot level and the target soot level is lower than a threshold.

If it is determined that the current GPF soot level is equal to the target soot level, or that the difference is lower than the threshold, it may be inferred that no further change in GPF soot level is required for improving emissions quality. Therefore, at 212, current engine operation with existing engine operating parameters may be continued. This includes continuing to collect exhaust soot on the GPF as engine operation changes, and initiating filter regeneration when the soot level on the GPF is higher than a regeneration threshold level. During this time, exhaust soot is generated during engine operation, but the exhaust soot generation is not actively increased.

If it is determined that the GPF soot level is not equal to the target soot level, or that the difference (between the current GPF soot level and the target soot level) is higher than the threshold, it may be inferred that the GPF operation may be affected. At 214, the routine may include determining if the current GPF soot level is higher than the target soot level. If it is determined that the current GPF soot level is higher than the target soot level, one or more engine actuators such as an electric switch on an electric circuit coupled to the GPF may be actuated to reduce the current GPF soot load. Also, a plurality of engine operating parameters may be adjusted to increase the exhaust gas temperature which may be used as the source of the heat to start the regeneration process.

In order to reduce the GPF soot level to the target level, at 216, the controller may initiate GPF regeneration. In order to initiate GPF regeneration, the controller may send a signal to close the switch on an electric circuit coupled to the GPF. By closing the switch, electric current may flow through the circuit and through the GPF. The electric current may increase the temperature at the GPF which may facilitate burning off the soot deposited on the GPF. As the regeneration progresses, the soot level on the GPF may steadily decrease. The duration of regeneration, the temperature (directly proportional to the electric current flowing through the circuit) of the GPF, and the oxygen supply to the GPF may govern the rate of regeneration of the GPF (degree of decrease in soot level). In one example, rate of regeneration (rate of decrease in the soot level) may increase with one or more of an increase in duration of the regeneration, an increase in GPF temperature (magnitude of electric current flowing through the electric circuit and/or degree of change in engine operating parameters), and an increase in oxygen supply to the GPF. Therefore, in order to increase the rate of regeneration of the GPF one or more of regeneration duration, GPF temperature, and GPF oxygen supply may be correspondingly increased. As the soot is burnt at the GPF, ash may be generated which may be deposited in the GPF.

Once GPF regeneration has been initiated by actuation of the switch, the temperature of the GPF may increase to a higher than desired level, causing an increased rate of soot regeneration. If the rate of regeneration increases to beyond a desired level, a greater than expected soot load may be burnt and the GPF soot level may consequently decrease to below the target level. Therefore, during the GPF regeneration, at 217, in order to maintain the GPF soot level at the target level (and not reduce it any further), a rate of soot generation (at the engine) may be opportunistically increased by retarding spark timing. The controller may send a signal to an actuator coupled to the spark plug to retard the spark timing. In one example, a rate of GPF regeneration may be inferred based on GPF temperature, and/or regeneration duration, and responsive to the rate of filter regeneration being higher than a threshold rate (with an increased risk of GPF soot level decreasing to below the target level), spark timing may be retarded to increase soot generation at the engine, while continuing to regenerate the filter. The amount of spark retard applied may be increased as the rate of filter regeneration exceeds the threshold rate.

At 218, the routine includes determining if the current GPF soot level has reached the target soot level due to the regeneration process. If it is determined that the GPF soot level has not reached the target level and is still higher than the target level, at 220, GPF regeneration may be continued. If it is determined that the current GPF soot level has reached the target level, at 222, the regeneration process may be terminated. In order to terminate the regeneration, the controller may send a signal to actuate the switch to an open position to suspend flow of electric current through the GPF.

At 214, if it is determined that the GPF soot level is not higher than or equal to the target soot level, at 224, it may be inferred that the current GPF soot level is lower than the target soot level. For optimal performance of the GPF, the soot level on the GPF may be actively increased to the target level. Since GPF operation may also depend on the GPF ash level, at 226, an ash level on the GPF may be estimated based on durations and regeneration temperatures used for prior (one or more) regeneration events at the GPF, during which ash may have been produced by burning the soot. The duration and temperature of a regeneration event may be based on a desired rate of regeneration such that an amount of soot may be burnt that enables the GPF soot level to be reduced to the target level. As the duration of each regeneration event increases, and as the exhaust temperature at the time of regeneration increases, the amount of soot burnt increases, and the amount of ash accumulated on the GPF also correspondingly increases. Also, GPF soot levels prior to the initiation of the regeneration event may be taken into account to determine the amount of soot burnt and the amount of ash produced during each regeneration event. For example, as the amount of soot burnt on a regeneration increases, the soot load decreases and the ash load on the GPF increases. Additionally or alternatively, a combination of ash and soot load on the GPF may be estimated based on inputs from one or more pressure and temperature sensors coupled to the exhaust passage upstream and/or downstream of the GPF. A unique ash model may be used to estimate the ash load on the GPF. After multiple regenerations over a prolonged period of time, a significant amount of ash may be deposited on the GPF, which may have significant influence on GPF operation. Also, a significant amount of ash may be deposited on the GPF through natural oil consumption during various engine operating conditions. Therefore, by taking the ash load into account, the exhaust backpressures in the engine may be better controlled.

At 228, the routine includes determining if the ash level at the GPF is higher than a threshold ash level. If it is determined that the ash level on the GPF is higher than the threshold level, it may be inferred that even if the GPF soot level is lower than the target level, the higher than threshold ash level may suffice in providing desired GPF functionality.

In the presence of a higher than threshold ash level on the GPF, active generation of soot may not be desired as this may cause an increase in undesired exhaust backpressure. Therefore, in response to detection of a higher than threshold GPF ash level, at 230, the current engine operation may be continued without any changes to the engine operating parameters.

If it is determined that the current ash level is lower than the threshold level, at 232, GPF soot level may be actively increased by adjusting one or more engine operating parameters to increase exhaust soot generation. In one example, at 234, start timing of fuel injection may be advanced which may result in incomplete combustion of gasoline resulting in higher soot generation. The controller may send a pulse-width signal to an electronic driver coupled to the fuel injector to advance the start of the injection timing. Advancing the fuel injection timing may include advancing one or more of a start of injection timing, an end of injection timing, and an average injection timing. Also, at 236, fuel rail pressure may be reduced to alter the fueling schedule which may result in incomplete combustion and increased soot generation. In one example, the controller may send a signal to the fuel pump to alter the pump output in order to reduce the fuel rail pressure. The degree of advancement of start of injection timing and/or the level of fuel rail pressure reduction may be based on the difference between the current GPF soot level and the target soot level and may be continuously adjusted as the difference changes. In one example, the degree of advancement of start of injection timing and/or the level of fuel rail pressure reduction may be increased with increase in the difference between the actual GPF soot level, and the target soot level. Similarly, the degree of advancement of start of injection timing and/or the level of fuel rail pressure reduction may be decreased with decrease in the difference between the actual GPF soot level, and the target soot level. In this way, one or more engine operating parameters may be adjusted until the actual GPF level reaches the target soot level.

Once the actual GPF soot level reaches the target soot level, at 238, the combined GPF soot level and the ash level may be maintained at the target soot level for optimal performance of the GPF. The target level may change based on engine operating conditions, and soot generation, and/or GPF regeneration may be actively adjusted to maintain the current soot level at the corresponding target level.

In alternate examples, instead of assessing the soot load and the ash load individually, an aggregated soot and ash load on the GPF may be monitored and maintained at a threshold level for optimal operation of the GPF. The ash load on the GPF may be estimated based on factors such as durations and regeneration temperatures used for prior GPF regeneration events, and GPF soot levels prior to the initiation of the regeneration events. The amount of soot burnt and the amount of ash produced may be inferred from the above mentioned factors. The soot load may be estimated based on a pressure differential across the particulate filter. Responsive to an aggregated ash and soot load of an exhaust particulate filter being lower than a threshold load, engine soot output may be increased until the aggregated load is at the threshold load, and responsive to the aggregated load being higher than the threshold load, the filter may be regenerated while retarding spark timing until the aggregated load is at the threshold load. The spark timing may be retarded during the regeneration process in order to increase soot generation at the engine, such that a higher than desired soot level is not burnt and a higher level of ash is not produced due to an increased regeneration rate. Therefore, regenerating the filter while retarding spark timing includes, retarding spark timing by an amount proportional to a rate of regeneration of the filter while continuing to regenerate the filter. A rate of soot generation (by retarding spark timing) and GPF regeneration (causing decrease in soot level and increase in ash level) may be adjusted concurrently to maintain a target combined soot and ash level on the GPF. For a given engine operating condition, the target level for the combined soot and ash level may be different from the target soot level.

FIG. 3 shows an example operating sequence 300 illustrating adjustment of engine operating parameters for maintenance of a target soot level on a gasoline particulate filter (GPF). The horizontal (x-axis) denotes time and the vertical markers t1-t9 identify significant times in the operation of the GPF.

The first plot, line 302, shows a variation in engine speed over time. Dotted line 303 shows a threshold engine speed above which the target soot level on the GPF may change. In one example, dotted line 303 corresponds to an engine idling speed. The second plot, line 304, shows change in engine temperature over time, and dotted line 305 denotes a threshold temperature below which the engine may be considered to be cold, such as during cold-start conditions. Once the engine temperature increases to above the threshold 305, the engine may be considered to be warm enough for the exhaust catalyst activation (light-off). The third plot, line 306, shows a current soot level on the GPF as estimated based on one or more pressure and temperature sensors coupled to the exhaust passage upstream and/or downstream of the GPF. Dotted line 307 shows a target soot level on the GPF as determined based on current engine operating conditions including engine temperature, and engine speed. The fourth plot, line 308, shows an ash level on the GPF. Ash is produced at the GPF during GPF regeneration processes when soot is burnt at higher temperature. Dotted line 309 shows a threshold ash level above which the ash load may influence the target soot level on the GPF. The fifth plot, line 310, shows GPF regeneration to reduce current GPF soot level to the target soot level. The sixth plot, line 312, shows an advancement of injection timing to actively increase soot generation in order to increase the current soot level to the target soot level.

Prior to time t1, the engine starts from rest after a period of inactivity during which the vehicle was not propelled. Due to a lower engine temperature (below the threshold temperature 305) at the time of the engine start, the engine may undergo a cold-start. During the engine cold-start, engine fueling is resumed and the engine speed gradually increases. The engine is operated under lower load conditions. Due to the cold-start conditions, the exhaust catalyst may not have attained its light-off temperature, and during this time, by maintaining the soot level on the GPF at a target level, emissions quality may be improved. The target level of soot on the GPF may be determined based on conditions such as engine temperature, engine speed, and engine load. During cold-start conditions, the soot level in the exhaust may be higher, and it may be observed that the current GPF soot level is significantly higher than the target soot level.

Therefore, in order to reduce the current soot level to the target soot level for improved emissions quality, at time t1, GPF regeneration may be initiated by adjusting a plurality of engine operating parameters to increase the exhaust gas temperature and/or by actuating a switch on an electric circuit coupled to the GPF. In one example, adjusting the engine operating parameters includes operating the engine richer than stoichiometry for a duration to raise the exhaust temperature. As another example, the engine may be operated with spark timing retarded for a duration. By closing the switch, electric current may flow through the circuit and through the GPF, which may increase the temperature at the GPF facilitating burning of the soot deposited on the GPF. As the regeneration progresses, the soot level on the GPF may steadily decrease. The duration of regeneration, the temperature (directly proportional to the electric current flowing through the circuit) of the GPF, and the air supply to the GPF may be based on the difference between the actual GPF soot level and the target soot level, such that an optimal amount of soot may be burned during the regeneration process. As the soot is burnt at the GPF, ash may be generated which may result in an increase in the ash level on the GPF. An actual ash level of the GPF may be inferred based at least on a duration of the actuating of the switch. Between time t1 and t2, the regeneration process may be continued, and consequently, a steady decrease in GPF level may be observed.

At time t2, it may be observed that the engine temperature has increased to above the threshold temperature, and the exhaust catalyst may be determined to be fully functional. Also, at this time, the engine speed may be lower than the idling speed. In response to the increase in engine temperature (at a lower than idling engine speed), the target GPF level may be decreased to a level suitable for optimal performance of the emissions control system. Also, at this time, it may be observed that the current GPF soot level is equal to the GPF target soot level. Therefore, further GPF regeneration may not be desired. The regeneration process may be suspended by readjusting engine operating parameters (for example, to resume stoichiometric engine combustion or to resume spark timing at or around MBT) and/or by opening the switch on the electric circuit coupled to the GPF in order to suspend flow of electricity through the GPF.

Between time t2, and t3, it may be observed that the current GPF soot level is equal to the target GPF level, and therefore no further change in current GPF soot level may be desired. At time t3, the engine speed may increase to above the threshold speed, and correspondingly the target GPF level may also be increased in order to maintain GPF functionality. However, between time t3, and t4, it may be observed that the current GPF level is significantly lower than the target level which may adversely affect GPF operation.

Therefore, at time t4, in order to increase the current GPF soot level to the target level, active generation of soot may be initiated. In order to increase soot level on the GPF, soot production at the engine exhaust may be increased by advancing a start of fuel injection timing which may result in multiple incomplete combustion events. The degree of advancement of injection timing may be based on the difference between the current GPF soot level, and the target soot level, the degree of advancement increased as the difference increases.

Between time t4, and t5, the current GPF soot level may steadily increase due to the advancement of fuel injection timing, and the resulting increase in production of soot. At time t5, it may be inferred that the current soot level is at the target GPF level corresponding to the current engine operating conditions. Therefore, at this time, the start of the injection timing may no longer be advanced and a nominal fueling schedule may be resumed.

Also, at time t5, the engine speed may decrease (e.g., to below an idling speed), and the target GPF level may be correspondingly decreased. Between time t5 and t6, the current GPF level may be higher than the target level which may result in reduced performance of the exhaust system. Therefore, at time t6, GPF regeneration may be initiated by closing the switch to flow electric current through the circuit and through the GPF, which may increase the GPF temperature. Between time t6 and t7, the regeneration process may be continued, and consequently, a steady decrease in GPF level may be observed.

At time t6, the difference between the target soot level and the current GPF soot level may be smaller than the difference between the target soot level and the current GPF soot level at the onset of the prior regeneration event (at time t1), therefore a lower amount of soot may be desired to be burnt at the GPF to reach the target level compared to the amount of soot burnt during the prior regeneration event. Once GPF regeneration has been initiated by actuation of the switch, the temperature of the GPF may increase to a higher than desired level, causing an increased rate of regeneration which may result in removal of a greater than expected soot load. In order to maintain the soot level at the target level (and not decrease to below the target level), a rate of soot generation (at the engine) may be increased by retarding spark timing. In order words, a rate of the regeneration may be limited by retarding spark timing to increase engine soot output until the actual soot level is at the target level. As such, during the prior GPF regeneration event (between time t1 and t2) since a higher amount of soot (bigger difference between the target soot level and the current GPF soot level) was desired to be removed from the GPF, soot generation via spark retard may not have been carried out. Also, during this time, as the soot is burnt at the GPF, ash may be generated which may result in an increase in the ash level on the GPF.

At time t7, it may be observed that the current soot level on the GPF has reduced to the target soot level, and consequently, the regeneration process may be terminated. Also, at this time, it may be observed that the ash level on the GPF has increased to above the threshold level. A higher than threshold GPF ash level may substantially influence the operation of the GPF in trapping exhaust soot.

Between time t7, and t8, the engine may operate at a higher than threshold engine speed, and also the target soot level on the GPF may increase. During this time, there may be a difference between the current GPF soot level, and the target soot level. However, due to the higher than threshold ash level at the GPF, an expedited increase in soot level by active adjustments to one or more engine operating parameters may not be desired. The combined ash level and the soot level may be sufficient for optimal functioning of the emissions control system.

At time t8, the engine may be turned off and the vehicle may not be operated. The vehicle and the engine may continue to be inactive for a substantial duration of time, between time t8, and t9. At time t9, the engine may start from rest under cold-start conditions with lower than threshold engine temperature. Also, the engine speed may be below the threshold speed. Based on the engine operating conditions, the target soot level may be determined, and it may be observed that due to a previous controlled regeneration, the current soot level on the GPF is equal to the target soot level. Therefore further adjustments to GPF soot and ash level (regeneration or active soot generation) may not be desired at this time. In this way, by maintaining a target soot level on the GPF even during cold-start conditions, when the catalyst may not be fully functional, the capture rate of soot at the GPF may be maintained at an optimal level.

In this way, by maintaining a target soot level on a gasoline particulate filter (GPF) by actively adjusting soot generation, and GPF regeneration, the emissions control system may function with higher accuracy even during conditions such as cold-start. By determining the target soot level based on current engine operating conditions, GPF performance may be maintained at different engine operating conditions. The technical effect of using a lower filtration capacity with a lower density filtration mesh, exhaust system backpressure may be reduced, and consequently engine power output and fuel efficiency may be increased. Also, by using a lower density filtration mesh component cost for the GPF may be reduced.

One example method for an engine comprises responsive to actual soot level at an exhaust particulate filter being lower than a target soot level, adjusting one or more of a fuel injection timing and a fuel injection pressure to increase soot output of the engine until the actual soot level is at the target soot level, the target soot level varied based on engine temperature and engine load. In the preceding example, additionally or optionally, the target soot level is set to a first target soot level during engine start conditions when the engine temperature is below a threshold temperature and the engine speed is below a threshold speed, the target soot level is set to a second target soot level during engine idling conditions when the engine temperature is above the threshold temperature and the engine speed is below the threshold speed, and the target soot level is set to a third target soot level when the engine temperature is above the threshold temperature and the engine speed is above the threshold speed. In any or all of the preceding examples, additionally or optionally, the first target soot level is based on a fuel injection schedule during the engine start conditions, the second target soot level is based on the fuel injection schedule during the engine idling conditions, and the third target soot level is based on the fuel injection schedule when the engine temperature is above the threshold temperature and the engine speed is above the threshold speed, wherein the fuel injection schedule includes one or more of a split ratio of port injected fuel relative to direct injected fuel, a split ratio of compression stroke directed injected fuel relative to intake stroke direct injected fuel, and a number of compression stroke direct injections per fueling event. In any or all of the preceding examples, additionally or optionally, the target soot level is varied to maintain a capture rate of soot at the filter above a threshold capture rate. Any or all of the preceding examples further comprising, additionally or optionally, estimating an ash level of the filter based on filter regeneration parameters, and further varying the target soot level based on the estimated ash level to maintain an aggregated ash and soot load of the filter within a threshold load. In any or all of the preceding examples, additionally or optionally, adjusting one or more of the fuel injection timing and the fuel injection pressure includes advancing the fuel injection timing and decreasing fuel rail pressure to actively raise the soot output of the engine. In any or all of the preceding examples, additionally or optionally, advancing the fuel injection timing includes advancing one or more of a start of injection timing, an end of injection timing, and an average injection timing. In any or all of the preceding examples, additionally or optionally, a degree of advancing the start of injection timing, and a degree of reducing the fuel rail pressure is increased as a difference between the target soot level and the actual soot level increases. Any or all of the preceding examples further comprising, additionally or optionally, responsive to the actual soot level at the exhaust particulate filter being higher than the target soot level, initiating filter regeneration, and responsive to a rate of filter regeneration being higher than a threshold rate, retarding spark timing to generate soot at the engine while continuing to regenerate the filter. In any or all of the preceding examples, additionally or optionally, an amount of spark retard applied is increased as the rate of filter regeneration exceeds the threshold rate. In any or all of the preceding examples, additionally or optionally, the engine is fueled with gasoline and wherein the filter is a gasoline particulate filter.

Another example method for an engine comprises responsive to an aggregated ash and soot load of an exhaust particulate filter being lower than a threshold load, increasing engine soot output until the aggregated load is at the threshold load; and responsive to the aggregated load being higher than the threshold load, regenerating the filter while retarding spark timing until the aggregated load is at the threshold load. In the preceding example, additionally or optionally, increasing engine soot output includes one or more of advancing a start of injection timing of a cylinder fuel injection and decreasing a fuel rail pressure to actively generate soot at the engine and raise the soot load on the exhaust particulate filter. In any or all of the preceding examples, additionally or optionally, an amount of injection timing advance and an amount of fuel rail pressure reduction is increased as the aggregated load falls below the threshold load. In any or all of the preceding examples, additionally or optionally, regenerating the filter while retarding spark timing includes retarding spark timing by an amount proportional to a rate of regeneration of the filter while continuing to regenerate the filter. In any or all of the preceding examples, additionally or optionally, the ash load is estimated based on a duration of filter regeneration and wherein the soot load is estimated based on a pressure differential across the particulate filter.

In yet another example an engine system comprises an engine including a cylinder; an exhaust passage receiving combustion gases from the cylinder; a gasoline particulate filter (GPF) having a lower than threshold filtration mesh density, coupled to the exhaust passage; one or more pressure sensors coupled to the GPF; one or more temperature sensors coupled to the GPF; a fueling system including a fuel rail, a fuel tank, a fuel pump, and a fuel injector for delivering fuel to the engine cylinder; and a controller with computer readable instructions stored on non-transitory memory for: inferring an actual soot load of the GPF based on inputs of the one or more pressure sensors and temperature sensors; and as the actual soot load falls below the target load, increasing soot output by the engine by advancing a timing of actuating the fuel injector or decreasing a pressure of the fuel rail until the actual soot load is at the target load. In the preceding example, additionally or optionally, the controller includes further instructions for: selecting the target load based on each of an engine temperature, an engine speed, and an engine load, the target load increased with a decrease in the engine temperature, an increase in the engine speed, and an increase in the engine load. In any or all of the preceding examples, additionally or optionally, the controller includes further instructions for: inferring an actual ash load of the GPF based on a duration of the actuating of the switch; and following filter regeneration, maintaining an aggregate of the actual soot load and the actual ash load at the target load by advancing a timing of actuating the fuel injector. In any or all of the preceding examples, additionally or optionally, the controller includes further instructions for: as the actual soot load exceeds the target load, regenerating the filter to reduce the soot load on the filter, a rate of the regenerating limiting by retarding spark timing to increase engine soot output until the actual soot load is at the target load.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
responsive to each of a current soot level at an exhaust particulate filter being lower than a target soot level and an ash level at the exhaust particulate filter being lower than a threshold ash level, adjusting one or more of a fuel injection timing and a fuel injection pressure to increase soot output of the engine until the current soot level is at the target soot level, the target soot level varied based on engine temperature and engine load.

2. The method of claim 1, wherein the target soot level is varied to maintain a capture rate of soot at the filter above a threshold capture rate, and the target soot level is set to a first target soot level during engine start conditions when the engine temperature is below a threshold temperature and the engine speed is below a threshold speed, the target soot level is set to a second target soot level during engine idling conditions when the engine temperature is above the threshold temperature and the engine speed is below the threshold speed, and the target soot level is set to a third target soot level when the engine temperature is above the threshold temperature and the engine speed is above the threshold speed, wherein the first target soot level, the second target soot level, and the third target soot level are distinct from each other.

3. The method of claim 2, wherein the first target soot level is based on a fuel injection schedule during the engine start conditions, the second target soot level is based on a fuel injection schedule during the engine idling conditions, and the third target soot level is based on a fuel injection schedule when the engine temperature is above the threshold temperature and the engine speed is above the threshold speed, wherein the fuel injection schedules include one or more of a split ratio of a fuel injected via a port fuel injector relative to the fuel injected via a direct fuel injector, a split ratio of the fuel injected via the direct fuel injector during a compression stroke relative to the fuel injected via the direct fuel injector during an intake stroke, and a number of fuel injections via the direct fuel injector per fueling event during the compression stroke.

4. The method of claim 1, further comprising estimating an ash level of the filter based on each of a duration of regeneration and a regeneration temperature for one or more prior regeneration events of the filter, and further varying the target soot level based on the estimated ash level to maintain an aggregated ash and soot load of the filter within a threshold load.

5. The method of claim 1, wherein adjusting one or more of the fuel injection timing and the fuel injection pressure includes advancing the fuel injection timing and decreasing fuel injection pressure to actively raise the soot output of the engine.

6. The method of claim 5, wherein advancing the fuel injection timing includes advancing one or more of a start of injection timing, an end of injection timing, and an average injection timing.

7. The method of claim 6, wherein a degree of advancing the start of injection timing and a degree of reducing the fuel injection pressure is increased as a difference between the target soot level and the current soot level increases.

8. The method of claim 1, further comprising, responsive to the current soot level at the exhaust particulate filter being higher than the target soot level, initiating filter regeneration, and responsive to a rate of filter regeneration being higher than a threshold rate, retarding spark timing to generate soot at the engine while continuing to regenerate the filter.

9. The method of claim 8, wherein an amount of spark retard applied is increased as the rate of filter regeneration exceeds the threshold rate.

10. The method of claim 1, wherein the engine is fueled with gasoline, and wherein the filter is a gasoline particulate filter.

11. A method for an engine, comprising:
responsive to each of a soot load of an exhaust particulate filter being lower than a threshold load and an ash level of the exhaust particulate filter being lower than a threshold ash level, increasing engine soot output until the soot load is at the threshold load; and
responsive to the soot load being higher than the threshold load, irrespective of the ash level of the exhaust particulate filter, regenerating the filter while retarding spark timing until the soot load is at the threshold load.

12. The method of claim 11, wherein increasing engine soot output includes one or more of advancing a start of injection timing of a cylinder fuel injection and decreasing a fuel rail pressure to actively generate soot at the engine and raise the soot load of the exhaust particulate filter.

13. The method of claim 12, wherein an amount of injection timing advance and an amount of fuel rail pressure reduction is increased as the soot load falls below the threshold load.

14. The method of claim 11, wherein regenerating the filter while retarding spark timing includes increasing an amount of spark retard with an increase in a rate of regeneration of the filter while continuing to regenerate the filter.

15. The method of claim 11, wherein the ash level is estimated based on a duration of filter regeneration and wherein the soot load is estimated based on a pressure differential across the filter.

16. An engine system comprising:
an engine including a cylinder;
an exhaust passage receiving combustion gases from the cylinder;
a gasoline particulate filter (GPF), coupled to the exhaust passage;
one or more pressure sensors coupled to the GPF;
one or more temperature sensors coupled to the GPF;
an electric circuit coupled to the GPF, the electric circuit including an electric switch;
a fueling system including a fuel rail, a fuel tank, a fuel pump, and a fuel injector for delivering fuel to the engine cylinder; and
a controller with computer readable instructions stored on non-transitory memory for:
inferring a current soot load of the GPF based on inputs of the one or more pressure sensors and temperature sensors;
inferring an actual ash load of the GPF based on a duration of actuation of the switch during a GPF regeneration; and
in response to each of the current soot load falling below a target load and the actual ash load falling below a threshold ash load, increasing soot output by the engine by advancing a timing of actuating the fuel injector or decreasing a pressure of the fuel rail until the current soot load is at the target load.

17. The system of claim 16, wherein the controller includes further instructions for:
selecting the target load based on each of an engine temperature, an engine speed, and an engine load, the target load increased with one or more of a decrease in the engine temperature, an increase in the engine speed, and an increase in the engine load.

18. The system of claim 16, wherein the controller includes further instructions for:
following the GPF regeneration, maintaining an aggregate of the current soot load and the actual ash load at the target load by advancing the timing of actuating the fuel injector.

19. The system of claim 16, wherein the controller includes further instructions for:
as the current soot load exceeds the target load, regenerating the filter to reduce the soot load on the filter, a rate of the regenerating adjusted by retarding spark timing to increase engine soot output until the current soot load is at the target load.

20. The method of claim 1, further comprising, responsive to each of the current soot level at the exhaust particulate filter being lower than the target soot level and the ash level at the exhaust particulate filter being higher than the threshold ash level, maintaining the soot output of the engine by maintaining the fuel injection timing and the fuel injection pressure.

* * * * *